United States Patent
Brand et al.

(10) Patent No.: US 6,296,395 B1
(45) Date of Patent: Oct. 2, 2001

(54) SELF-ALIGNING ROLLER BEARING

(75) Inventors: Armin Brand, Kissing; Werner Ganss, Schweinfurt; Martin Grehn, Dittelbrunn; Michael Weigand, Elfershausen, all of (DE)

(73) Assignee: FAG OEM und Handel AG, Schweinfurt (DE)

( * ) Notice: Subject to any disclaimer, the term of this patent is extended or adjusted under 35 U.S.C. 154(b) by 0 days.

(21) Appl. No.: 09/508,667

(22) PCT Filed: Sep. 21, 1998

(86) PCT No.: PCT/EP98/06017

§ 371 Date: Mar. 22, 2000

§ 102(e) Date: Mar. 22, 2000

(87) PCT Pub. No.: WO99/15801

PCT Pub. Date: Apr. 1, 1999

(30) Foreign Application Priority Data

Sep. 22, 1997 (DE) ............................. 197 41 803
Sep. 26, 1997 (DE) ............................. 197 42 570

(51) Int. Cl.[7] .............................. F16C 23/04; F16C 33/58
(52) U.S. Cl. ....................... 384/558; 384/564; 384/568
(58) Field of Search .................... 684/450, 551, 684/558, 560, 564, 568

(56) References Cited

U.S. PATENT DOCUMENTS

| 1,498,571 | | 6/1924 | Palmgren | 384/571 |
|---|---|---|---|---|
| 1,528,363 | * | 3/1925 | Bronander | 384/568 |
| 1,548,821 | * | 8/1925 | Bronander | 384/564 |
| 2,740,675 | | 4/1956 | Palmgren | 384/564 |
| 3,547,504 | * | 12/1970 | Bobowicz et al. | 384/558 |
| 3,990,753 | * | 11/1976 | Kellstrom et al. | 384/450 |
| 4,530,610 | | 7/1985 | Stackling | 384/560 |
| 4,557,613 | * | 12/1985 | Tallian et al. | 384/568 |
| 5,009,524 | | 4/1991 | Dittenhoefer | 384/475 |
| 5,586,826 | | 12/1996 | Kellström et al. | 384/450 |
| 5,890,815 | * | 4/1999 | Ijuin et al. | 384/568 |

FOREIGN PATENT DOCUMENTS

| 644 181 | | 4/1937 | (DE) . | |
| 3616288-A1 | * | 11/1987 | (DE) | 384/558 |
| 38 09 906 | | 10/1989 | (DE) . | |

* cited by examiner

Primary Examiner—Thomas R. Hannon
(74) Attorney, Agent, or Firm—Nixon Peabody LLP; David S. Safran

(57) ABSTRACT

A self-aligning roller bearing includes an external ring with one curved external track, an internal ring with two curved internal tracks, two rows of rollers disposed between the external and internal rings, and a guide ring. The guide ring is located between the rows of rollers and is preferably configured as an circular annular disk. The guide ring has a rectangular cross section with the center line of the cross section running parallel to the bearing axis. The guide ring may also be dimensioned in such a way that the rollers are axially prestressed. The front faces of the rollers which face the guide ring are configured in a manner that the front faces only touch the guide ring at one point.

12 Claims, 3 Drawing Sheets

SELF-ALIGNING ROLLER BEARING

BACKGROUND OF THE INVENTION

1. Field of the invention

The invention relates to a self-aligning roller bearing with two rows of symmetrical rollers, an outer ring with a curved outer track, an inner ring with two curved inner tracks, and a guide ring which is provided between the rollers and which is made as a circular ring disk

2. Description of the Related Art

Antifriction bearings which are used to transfer radial and/or axial loads to rotating parts are divided according to the shape of their roller bodies into ball bearings on the one hand, and roller bearings on the other. In roller bearings, it is distinguished between cylinder, barrel-shaped, needle, tapered and self-aligning roller bearings. Self-aligning roller bearings contain two rows of barrel-shaped rollers with roller axes which are tilted relative to the bearing axis. The outer track is hollow-spherical so that in case of alignment faults and when the assigned shaft sags, the rollers can be adjusted in an oscillating manner in the outer track. The profile of the tracks is generally rather narrowly matched to the profile of the rollers. The different embodiments of the self-aligning roller bearings differ both in size itself and also in the size and shape of the rollers. Thus, there are both embodiments with symmetrical rollers and also those with asymmetrical rollers. In addition, there are embodiments with and without rims.

Self-aligning roller bearings have been used for more than fifty years. Due to their high bearing capacity, they have proven effective and are used wherever high impact-like forces must be accommodated and alignment faults and greater sagging of the assigned shaft must be expected. The main applications are heavy rollers and supporting rolls, marine shafts and rudder posts, rock crushers, crankshafts, transmissions, vibrating screens, milk, grinding and crushing machines. Due to the numerous applications, during decades of use of self-aligning roller bearings, attempts have been made again and again to further increase bearing capacity and reduce production costs by structural modifications. Thus, there have been attempts to guide the rollers with a loose guide ring instead of a middle rim permanently connected to the inner ring, or to abandon special guides completely so that the roller are guided solely by a cage. Normally, one such cage is designed to keep the individual rollers of a row of rollers at a uniform distance to one another and thus, to prevent their mutual contact. In a self-aligning roller bearing however, the rollers of the two rows of rollers move under load onto one another so that wear of the cage occurs when the guidance of the rollers is not assumed additionally by a middle rim or a guide ring.

Whenever a fixed middle rim or a loose guide ring is used in a self-aligning roller bearing, in the prior art, this middle rim or this guide ring has a trapezoidal cross section. Thus, German patent 644 181, FIGS. 2 and 3, published in 1937, discloses a self-aligning roller bearing in which a loose guide ring is used to guide the rollers. Here, the width of the trapezoidal guide ring is so large that The rollers are pressed to the sides of the self-aligning roller bearing. U.S. Pat. No. 2,740,675 published in 1956 discloses a self-aligning roller bearing in which there is a loose trapezoidal guide ring located on the inner ring between the rollers of the two rows of rollers. To obtain optimum friction behavior under different radial loads, the width of the guide ring should correspond exactly to the distance between the rollers of the two rows of rollers. Both in the self-aligning roller bearing as patented in German patent 644 181 and also in the self-aligning roller bearing patented in U.S. Pat. No. 2,740,675, the guide ring is designed on the one hand to safeguard the distance between rollers of the two rows of rollers and on the other to prevent crossing of the rollers. U.S. Pat. No. 5,586,826 which just recently issued discloses a self-aligning roller bearing with a trapezoidal guide ring. Here, the friction will be reduced by a special configuration of the rollers.

SUMMARY OF THE INVENTION

The primary object of the invention is now to make available a self-aligning roller bearing with high bearing capacity which on the one hand, can be easily and economically produced, on the other, has low friction even under high load so that high rpms are possible and a long service life is ensured The self-aligning roller bearing in accordance with the present invention in which the aforementioned object is achieved includes a guide ring that has a rectangular cross section and the cross sectional center line of the guide ring that runs parallel to the bearing axis. The advantage of a guide ring with a rectangular cross section compared to a guide ring which is made trapezoidal consists first of all in that this guide ring can be produced especially easily and consequently favorably. But mainly, the attained advantage is that a uniform distance between the rollers of the two rows of rollers is always ensured.

In conjunction with the above described measures one advantageous embodiment of the self-aligning roller bearing in accordance with the present invention acquires special importance; the guide ring is dimensioned such that the rollers are axially prestressed. Therefore, the guide ring exerts a force on the rollers at an acute angle to the roller axes, by which displacement of the contact points between the rollers and the outer track and the inner tracks is caused. Therefore, the pressure ellipses between the inner tracks and the rollers are shifted to the end face of the self-aligning roller bearing. Without this prestress, the rollers touch the outer track and the inner tracks at the location of their largest diameter so that the lines of force action of the inner ring and inner track - rollers and rollers - outer ring and outer track, cause crossing of the rollers. By displacement of the points of contact which is caused by the indicated prestress, the lines of force action of the inner ring and inner track - rollers and rollers - outer ring and outer track, are at an angle which reduces the crossing of the rollers.

In the self-aligning roller bearing in accordance with the present invention the guide ring, as is known, is preferably made as a loose guide ring. The guide ring is therefore guided on the inner ring, but is not joined to it. In this way, if necessary, a different material can be easily used for the guide ring than for the inner ring. But mainly, a loose guide ring has the advantage that the peripheral component of the guide ring speed is balanced by the co-rotation of the guide ring, i.e. approaches zero.

It is especially advantageous if in the self-aligning roller bearing, the end faces of the rollers facing the guide ring are made such that between the end faces of the rollers and the guide ring, there is only point contact, preferably the distance between the roller axes and the point contacts of the end faces of the rollers with the guide ring amounting to roughly 50 to 75% of the maximum roller diameter. The measure of executing the ends face of the rollers facing the guide ring such that between the end faces of the rollers and the guide ring there is only point contact can be accomplished in particular differently, specifically, either by the end faces of the rollers facing the guide ring being convexly curved, or by the rollers on the end faces which face the guide ring being provided with a bezel.

The above described measures ensure that with allowable crossing of the rollers, no contact of the edges of the end faces of the rollers with the guide rings occurs, so that "scoring" on the edges of the end faces of the rollers is precluded.

In particular, there are a host of possibilities for embodying the self-aligning roller bearing in accordance with the present invention

DETAILED DESCRIPTION OF THE INVENTION

Figure 1:
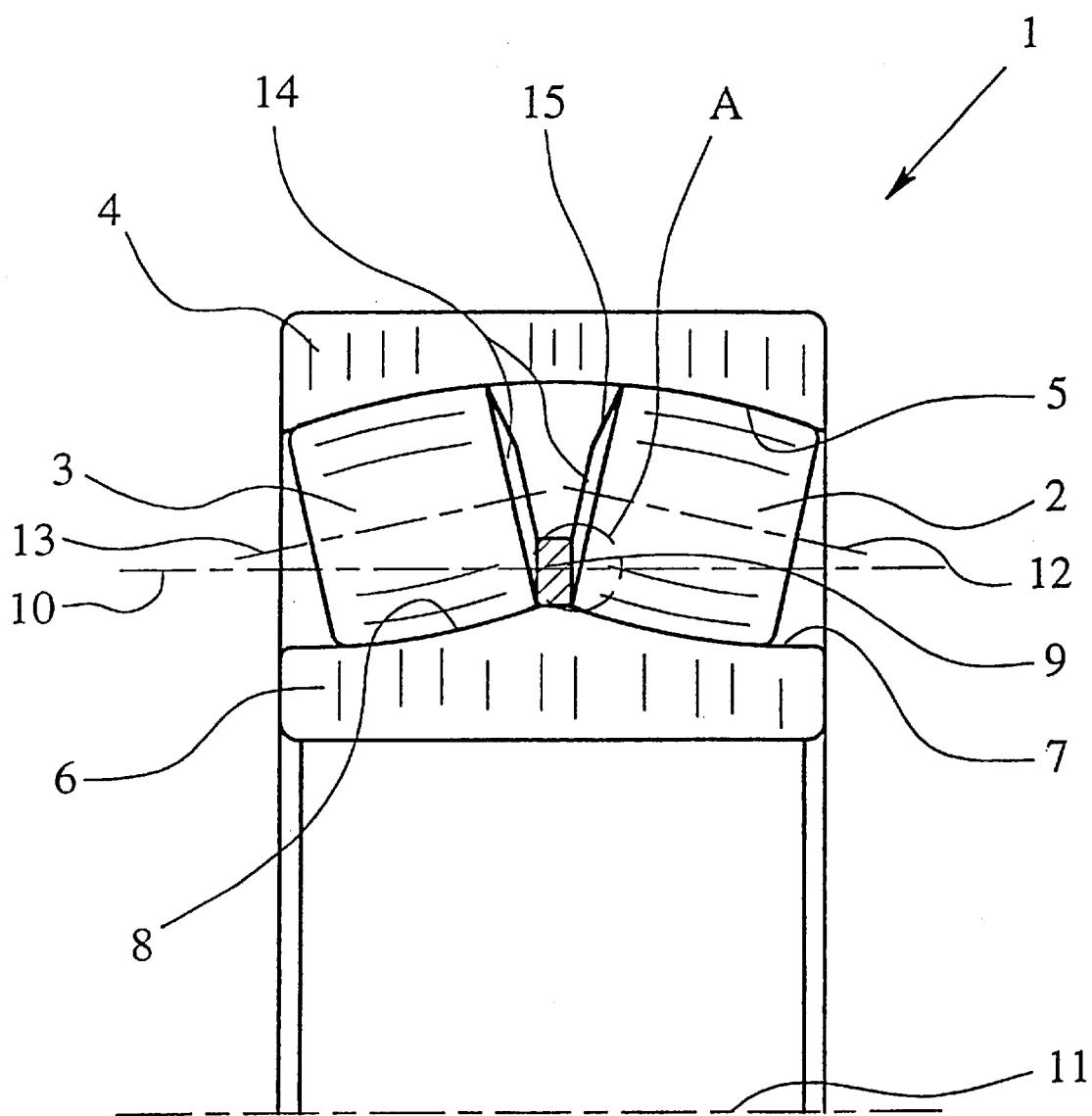
FIG. 1 shows a schematic of one half of a self-aligning roller bearing in accordance with one embodiment of the present invention viewed in the axial section.

FIG. 1 shows one half of a self-aligning roller bearing 1 in an axial section. The selfaligning roller bearing 1 includes of two rows of symmetrical rollers 2, 3 which are provided between an outer ring 4 with a curved outer track 5 and an inner ring 6 with two curved inner tracks 7, 8. Between the two rollers 2 and 3 of the two rows of rollers (of which the rollers 2, 3 are a part), there is a guide ring 9 which is made as a circular ring disk and which has a rectangular cross section. The cross sectional center line 10 of the guide ring 9 runs parallel to the bearing axis 11. Conversely the roller axes 12, 13 of the rollers 2 and 3 run at an angle to the bearing axis 11. This angle is labelled the bearing pressure angle and in the self-aligning roller bearings, typically has a value between 4° and 18°.

In the embodiment shown, the guide ring 9 is dimensioned such that the rollers 2, 3 are axially prestressed. Therefore, a force is exerted on the rollers 2, 3 at an acute angle to the rouer axes 12, 13 by the guide ring 9. In this way, displacement of the contact points between the rollers 2, 3 and the outer track 5 and the inner tracks 6, 7 is accomplished. Therefore, the pressure ellipses between the inner tracks 6, 7 and the rollers 2, 3 are shifted to the end faces of the self-aligning roller bearing in accordance with the present invention. By displacement of the contact points or the pressure ellipses, the lines of force action of the outer ring 4 and outer track 5 - rollers 2, 3 and rollers 2, 3 - inner ring 6 and inner tracks 7, 8 are at an angle, by which crossing of the rollers 2, 3 is reduced In this embodiment furthermore, the guide ring 9 is made loose, i.e. it is guided on the inner ring 6, but it can move perpendicular to the bearing axis 11 in the direction to the outer ring 4. Because the guide ring 9 is made loose, a material can easily be used which is different than for the inner ring 6. But mainly, the loose guide ring 9 has the advantage that the peripheral component of the guide ring speed is balanced by the concomitant turning of the guide ring 9, i.e. approaches zero.

A measure implemented in the embodiment is of quite special importance, specifically that the end faces 14 of the rollers 2, 3 facing the guide ring 9 are made such that between the end faces 14 and the guide ring 9, there is only point contact. Preferably, the distance between the roller axes 12, 13 and the point contacts of the end faces 14 with the guide ring 9 is roughly 50% to 75% of the maximum roller diameter.

The measure of making of the end faces 14 of the rollers 2, 3 facing the guide ring 9 such that between the end faces 14 and the guide ring 9, there is only point contact can be accomplished in various ways. One possibility is to make the end faces of the rollers 2, 3 facing the guide ring 9 convexly curved. Another possibility is accomplished in the embodiment shown; where the rollers 2, 3 are provided with a bezel 15 on the end faces 14 which face the guide ring 9. Preferably, the transition from the actual end faces 14 of the rollers 2, 3 is rounded or broken towards the respective bezel 15; so that this transition is not sharp-edged.

Figure 2:
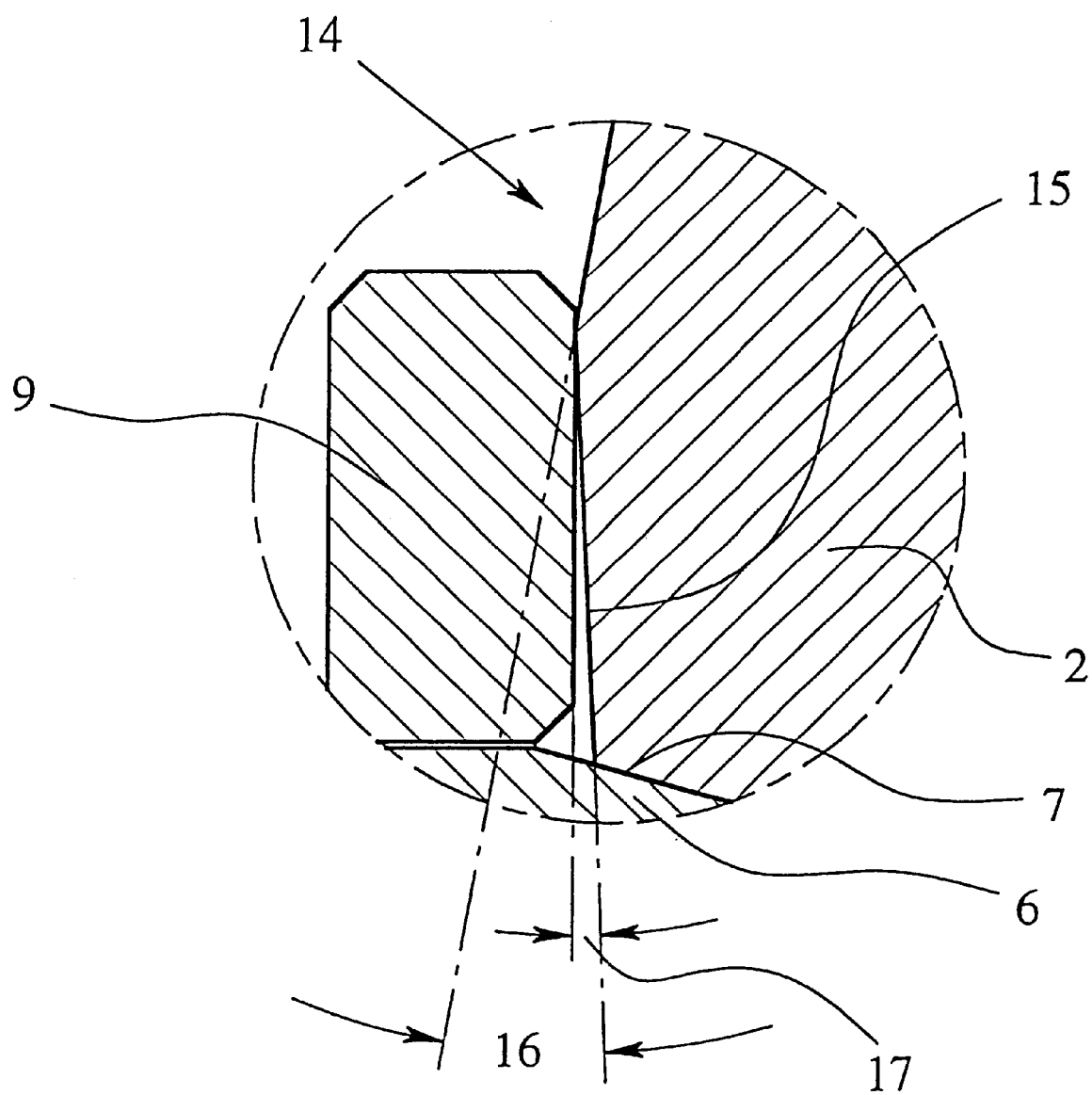
FIG. 2 shows an enlarged extract of the transition between a roller and the guide ring from the self-aligning roller bearing as shown in FIG. 1

The bezel angle 16, therefore the angle between the actual end faces 14 of the rollers 2, 3 and the bezels 15 is preferably roughly 1.5° greater than the bearing pressure angle which is set in operation. As shown in FIG. 2, this results in that between the rollers 2, 3 and the guide ring 9—more accurately between the end faces 14 of the rollers 2, 3 and the guide ring 9—there is always an opening angle 17 which arises from the difference from the bezel angle 16 and the bearing pressure angle. It is ensured by the opening angle 17 that between the end faces 14 of the rollers 2, 3 and the guide ring 9 at rest, only one point of contact occurs in operation, so that when relative movements occur in operation, only ever linear contact occurs. In addition the gap described by the opening angle 17 between the guide ring 9 and the rollers 2, 3 can be used to build up and maintain a lubricant film.

Figure 3:
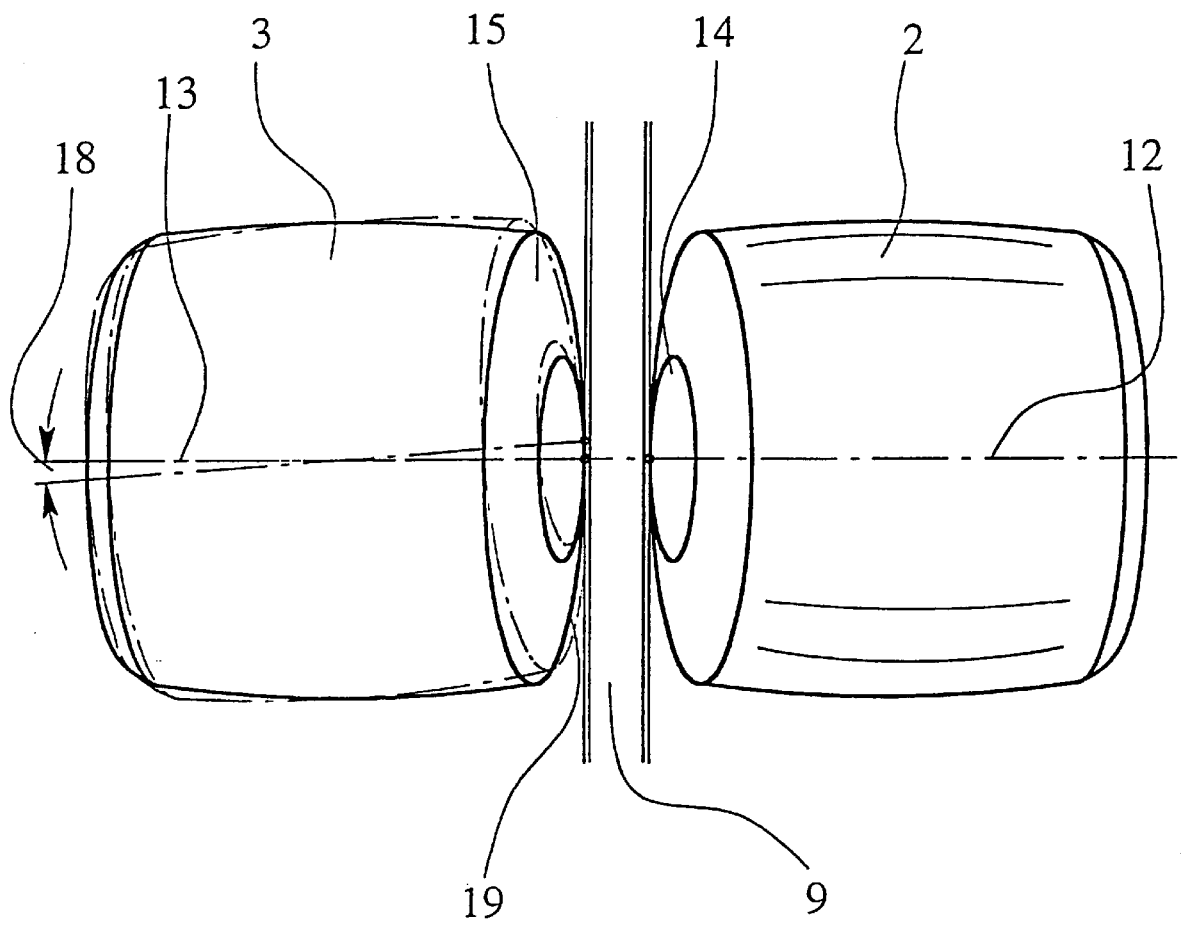
FIG. 3 shows in an overhead view a schematic representation of the contact between the rollers and the guide ring in a self-aligning roller bearing as shown in FIG. 1.

FIG. 3 shows the contact situation between the end faces 14 of the rollers 2, 3 and the guide ring 9 in an overhead view. Also, when the rollers 2, 3 cross by a crossing angle 18, contact of the edges 19 of the end faces 14 of the rollers 2, 3 with the guide ring 9 does not occur, so that scoring on the edges 19 of the end faces 14 of the rollers 2, 3 is precluded. This is shown in FIG. 3 by the position of the roller 3 which is shown by the broken line. Due to the crossing of the roller 3 by the crossing angle 18, the centerpoint of the end face 14 of the roller 3 migrates by only a small amount out of its original location. However the running behavior of the self-aligning roller bearing 1 is not noticeably influenced. In particular, there is no contact of the edge 19 of the roller 3 with the guide ring 9. Thus the roller 3 is not destroyed, by which the service life of the self-aligning roller bearing 1 is increased overall.

Combined implementation of the following measures is of special importance for the self-aligning roller bearing 1 in accordance with the illustrated embodiment of the present invention.

a) guide ring 9 with a rectangular cross section.

b) dimensioning of the guide ring 9 such that the rollers 2, 3 are axially prestressed c) embodiment of the end faces 14 of the rollers 2, 3 facing the guide ring 9 such that between the end faces 14 of the rollers 2, 3 and the guide ring 9, there is only point contact.

Tests have shown that in the joint implementation of the aforementioned measures, the friction which occurs in the self-aligning roller bearing 1 in accordance with the present invention is roughly 30 to even 50% less than the friction which occurs in comparable known self-aligning roller bearings.

What is claimed is:

1. A self-aligning roller bearing comprising:
an outer ring with a curved outer track;
an inner ring disposed within said outer ring, said inner ring including two curved inner tracks;
two rows of rollers disposed between said outer ring and said inner ring, each of said two rows of rollers including a plurality of rollers; and
a guide ring positioned between said two rows of rollers, said guide ring having a rectangular cross section and a cross sectional center line which extends parallel to an axial bearing axis.

2. The self-aligning roller bearing of claim 1, wherein said guide ring is a circular ring disk.

3. The self-aligning roller bearing of claim 1, wherein said guide ring is rotatable around said inner ring.

4. The self-aligning roller bearing of claim 1, wherein said guide ring is dimensioned in a manner to cause axial prestress of said two rows of rollers.

5. The self-aligning roller bearing of claim 1, wherein end faces of said plurality of rollers which face said guide ring are adapted to make a point contact with said guide ring.

6. The self-aligning roller bearing of claim 5, wherein said point contact between said end faces and said guide ring is at a distance in a range of about 50% to 75% of a maximum roller diameter from a roller axis.

7. The self-aligning roller bearing of claim 5, wherein said point contact between said end faces and said guide ring is positioned from a roller axis at a distance in a range of about 50% to 75% of a distance between at least one of said two inner tracks and a roller axis.

8. The self-aligning roller bearing of claim 5, wherein said end faces of said plurality of rollers which face said guide ring are convexly curved.

9. The self-aligning roller bearing of claim 5, wherein said end faces of said plurality of rollers which face said guide ring include a bezel.

10. The self-aligning roller bearing of claim 9, wherein an angle of said bezel is different than a bearing pressure angle.

11. The self-aligning roller bearing of claim 10, wherein said angle of said bezel is between 0.3° to 5° greater than said bearing pressure angle during operation of said self-aligning roller bearing.

12. The self-aligning roller bearing of claim 11, wherein said angle of said bezel is approximately 1.5° greater than said bearing pressure angle.

* * * * *